Feb. 6, 1962   J. R. HORNADAY, JR., ETAL   3,019,513
METHOD OF MANUFACTURE
Filed May 22, 1958

INVENTORS
James R. Hornaday, Jr.,
Charles W. Vigor,
Clarence J. Tobin &
James C. Holzwarth J.M. Champo
ATTORNEY

United States Patent Office 3,019,513
Patented Feb. 6, 1962

3,019,513
METHOD OF MANUFACTURE
James R. Hornaday, Jr., Royal Oak, Charles W. Vigor, East Detroit, Clarence J. Tobin, Detroit, and James C. Holzwarth, Birmingham, Mich., assignors to General Motors Corporation, Detroit, Mich., a corporation of Delaware
Filed May 22, 1958, Ser. No. 737,000
7 Claims. (Cl. 29—157.3)

This invention relates to a method of roll bonding stainless steel sheets and more particularly to a method of making a stainless steel article having integral passages therein for use in the manufacture of stainless steel heat exchangers such as radiators and the like.

It is known that a pair of sheets of weldable metals such as bronze, copper, brass or aluminum may be bonded together into a single unitary member by forge welding the sheets together as, for example, by means of rollers. This welding is generally accomplished by hot rolling the two sheets together at a sufficient temperature for hot working and with a 55% to 65% reduction in a single pass. This method, however, is not effective in bonding stainless steel sheets.

It is, therefore, the basic object of this invention to provide a practical and efficient method for bonding stainless steel by rolling means. It is a further object in this invention to provide a method of roll bonding a pair of stainless steel sheets while preventing the bonding of the sheets in certain selected areas. These and other objects are carried out by applying a stop-weld material between a pair of superimposed stainless steel sheets, in the areas which are not to be bonded, and thereafter subjecting the assembled sheets to a series of annealing and cold rolling operations including a first annealing step in a dry hydrogen atmosphere sufficient to anneal the sheets to a dead soft condition and to reduce any oxides on the surface to be bonded, a first cold rolling step sufficient to promote cohesion between the portions of the stainless steel sheets to be bonded, a second annealing step in a dry hydrogen atmosphere, a second cold rolling step and a final annealing step in a dry hydrogen atmosphere. In the fabrication of articles such as heat exchangers, the selected unbonded areas are expanded by hydraulic means to form tubular conduits in a manner well known in the art.

Other objects and advantages of this invention will more fully appear from the following description of a preferred embodiment of the invention, reference being made to the accompanying drawing of which:

Figure 1:
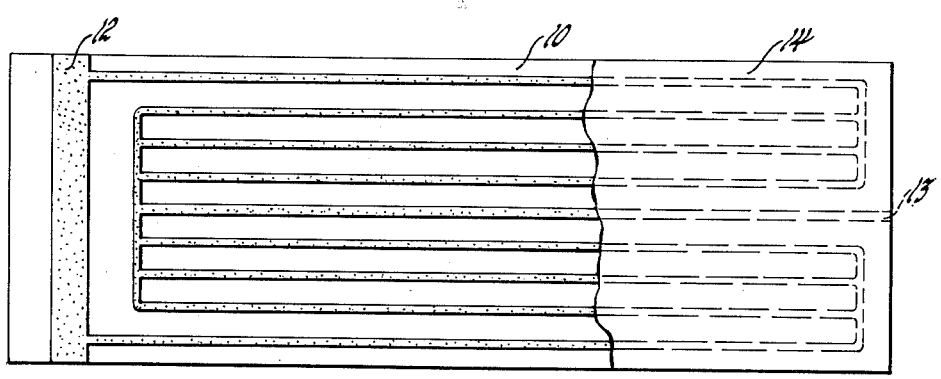
FIGURE 1 is an elevation, a portion of which is broken away, showing a pair of stainless steel plates superimposed one over another having a stop-weld material sandwiched between the sheets in certain selected areas.
Figure 2:
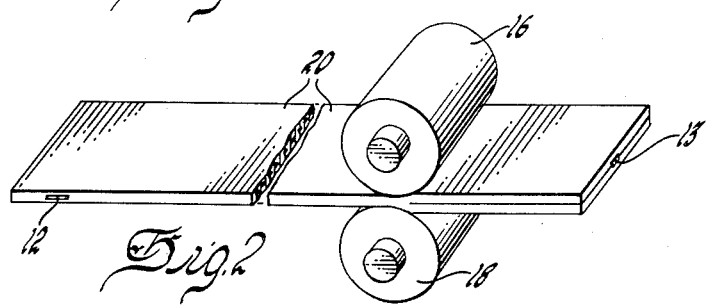
FIGURE 2 is the assembly shown in FIGURE 1 which has been partially rolled.
Figure 3:
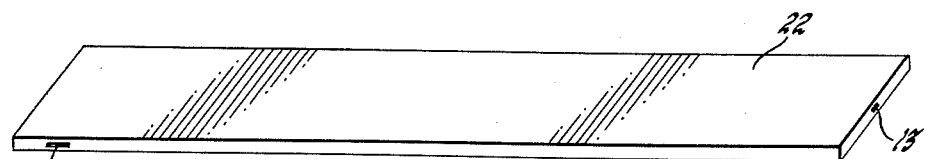
FIGURE 3 is a perspective view of the assembly shown in FIGURES 1 and 2 in its completed bonded form.
Figure 4:
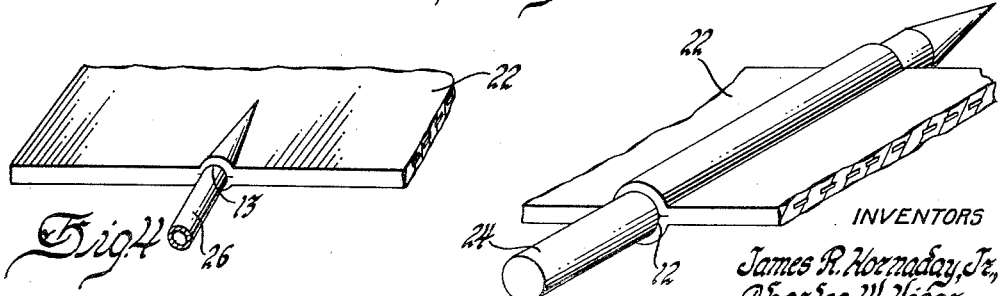
FIGURE 4 is a perspective view showing a conduit attached to an unbonded portion of the sheet shown in FIGURE 3 for use in hydraulically expanding the unbonded portions of the sheets.

A basic aspect of the present invention resides in a process of bonding stainless steel plates or sheets. By the term stainless steel, as used herein, is meant the well-known Austentic stainless steels containing both chromium and nickel, together totaling at least 23% of the composition, and having a minimum chromium content of about 16% and a minimum nickel content of about 7%. Stainless steel AISI types 302, 303, 304, and 316 are illustrative of the commonly used stainless steels. A specific example of a stainless steel to which the present invention applies is the AISI type No. 316 having the following nominal composition: chromium 16% to 18%, nickel 10% to 14%, molybdenum 2% to 3%, carbon 0.10% maximum, manganese 2% maximum, silicon 1% maximum, and the balance iron.

In carrying out the invention a pair of type 316 stainless steel sheets having an original thickness of about .032 inch are first thoroughly cleaned by washing them with liquid soap, rinsing and drying. Other methods of cleaning the sheets may, of course, be used. Thereafter the sheets are superimposed adjacent each other and spot-welded together at the corners thereof. Next the assembled strips are inserted into an oven containing a purified dry hydrogen atmosphere wherein they are annealed at about 2000° F. for one hour in an initial bright annealing operation. This heating step serves the double purpose of annealing the sheets to a dead soft or ductile condition to withstand subsequent heavy reductions in cross section and reducing any oxides on the surfaces to be bonded. In general various chromium-nickel stainless steels may be annealed at temperatures ranging from 1800° F. to 2100° F. While the time of the annealing step is not critical, it is essential that the anneal be long enough to insure complete reduction of the surface oxide. A particularly important factor in establishing a good bond between the sheets is the maintenance of a high degree of cleanliness of the interfaces of the sheets during the operations to be described. This step of annealing in a purified dry hydrogen atmosphere has been found to provide a very clean original surface. Likewise in the subsequent heat treatments to be described hereinafter, the heat treatment is performed in a purified dry hydrogen atmosphere to maintain cleanliness of the sheets. By the term purified dry hydrogen is meant hydrogen gas having a dew point of not greater than −60° F. The gas may contain inert gases such as nitrogen as would be present in cracked ammonia. However, the gas must be free of carbon and other materials which would adversely affect the stainless steel. After the sheets have been thoroughly annealed and cleaned, they are permitted to cool in a dry hydrogen atmosphere.

The cooled assembled sheets are then cold rolled to preferably about a 60% reduction in thickness. The amount of reduction in this rolling operation must be sufficient to promote cohesion between the two stainless steel sheets and to permit recrystallization of the metal across the interface of the sheets during subsequent annealing treatment. Intimate contact of the sheets after the initial cold rolling operation is essential since the slightest separation of the sheets after the initial cold rolling operation results in an unsatisfactory bond. It has been found that with type 316 stainless steel an initial reduction of from about 50% to 60% is essential. This reduction is preferably accomplished by a single pass. However, in some instances where the capacity of the rolling mill is not adequate to reduce the assembled sheets in a single pass, a second pass may be employed with satisfactory results. The cold rolling operation avoids surface oxidation of the metal and provides a smooth surface finish with dimensional tolerances maintained to close limits.

The stainless steel sheets, now reduced to about 60% in thickness, are again annealed for about 1 hour at about 2000° F. in dry purified hydrogen atmosphere in a second annealing operation and thereafter cooled in a dry hydrogen atmosphere, as in the case of the first annealing operation. This second annealing treatment softens the material and relieves the stresses induced in the initial cold reduction operation. This annealing step also promotes diffusion bonding at the mating surfaces of the stainless steel sheets which are held together by the relatively weak cohesion forces resulting from the initial cold rolling operation. The annealing and diffusion bonding operations are time-temperature dependent. Thus, for example, the annealing and diffusion heat treatments heretofore described may be obtained at between 1800° F. and 2100° F., but the time involved in this treatment would have to be varied accordingly. It has been found that an initial anneal and the following second heat treatment at 2000° F. for about one hour in a dry purified hydrogen atmosphere produce excellent results.

After the second heat treatment the assembled sheets are again cold rolled to about a 40% reduction of the thickness of the assembled sheets resulting from the first cold rolling operation to further strengthen the bond. A reduction of 30% to 40% in this step has been found to produce satisfactory results.

Preferably after the second cold rolling operation the sheets are again annealed, preferably for about one hour at 2000° F. in a purified dry hydrogen and cooled in a purified dry hydrogen atmosphere. The third annealing treatment further promotes diffusion bonding and homogeneity of the structure throughout the cross section of the bonded sheets in addition to softening and stress relieving the structure.

Microexamination of a joint bonded by the procedure as described above reveals a homogeneous structure with no evidence of the original interface.

The amount of reduction which is necessary in the second rolling step of the process is less critical than that of the first. While a 30% to 40% reduction in the second rolling step provides satisfactory results, any amount of reduction in the second rolling step which will produce a 100% bond following the final annealing treatment is, of course, satisfactory.

Figure 5:
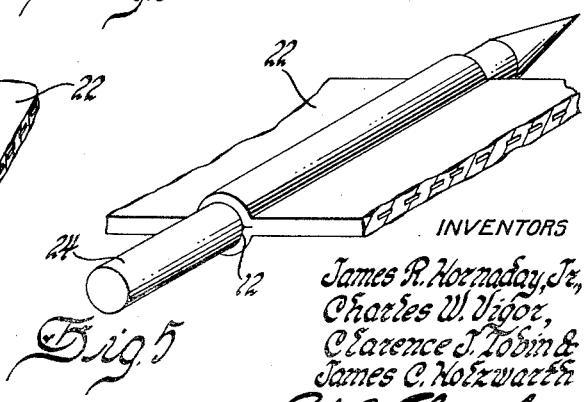
FIGURE 5 illustrates a die used to expand an unbonded portion of the roll bonded sheet shown in FIGURE 3.

An important aspect of the invention resides in a method of roll bonding a pair of stainless steel sheets as above described while preventing the bonding of the sheets in certain selected areas and thereafter expanding the unbonded areas by hydraulic means to form tubular conduits suitable to use as heat exchangers and the like. Referring to the drawing, a stainless steel sheet 10 is first provided over which a stop-weld material is applied in areas where it is desired to prevent bonding of the sheets to provide a suitable arrangement of conduits as will be hereinafter described. The stop-weld material may be applied by printing, rolling, painting, or spraying the stop-weld material in fluid or solid form. This stop-weld material must be of a type which will not be reduced under the annealing conditions heretofore described. Examples of suitable stop-weld materials include water suspensions or pastes of alumina, zirconia or magnesia or mixtures of these materials. A suitable commercial stop-weld material which has been found satisfactory is a proprietary material known as "Protect-O-Metal" sold by George W. Smith & Sons, Inc., 1700 Spaulding Street, Dayton, Ohio. After the stop-weld material 12 is applied and dried, another sheet 14 is superimposed over the sheet 10 and the two sheets are temporarily fastened together by spot-welding the corners. Thereafter in accordance with the roll bonding procedure set forth above, the sheets are annealed for about an hour at 2000° F. in a purified hydrogen atmosphere and then cooled in the hydrogen atmosphere. The thusly treated sheets are then cold rolled by means of rollers 16 and 18 sufficient to reducing the cross sectional thickness of the assembled sheets to about 60% of the original thickness, preferably in a single pass and not more than two passes. The thusly reduced assembly forms a weakly bonded sheet 20. The sheet 20 is again annealed for about an hour at 2000° F. and cooled in a hydrogen atmosphere as described above. Thereafter the sheet 20 is again cold rolled and reduced in thickness as above described to provide a finally reduced sheet 22 which, after the final annealing operation, forms a completely bonded and integral sheet at the areas to which the stop-weld material had not been applied. The thusly formed sheet is then expanded to form a heat exchanger in a manner fully described in the U.S. Patent No. 2,740,188 assigned to the assignee of the present invention. This is accomplished by expanding the large header portions 12 by means of a die 24 as shown in FIGURE 5. The die is removed and the ends of the header 12 are sealed by any suitable means. Thereafter the opening 13 is provided with a conduit 26 welded thereto. The bonded sheet 22 is then placed between suitable die members having complementary die cavities located in the areas of the sheet which have not been welded and hydraulic pressure is applied through the conduit 26 whereby the unbonded portions are expanded to form conduits of a shape determined by the configuration of the die cavity of the die members.

While this invention has been described by reference to certain preferred embodiments and conditions, it will be understood that the invention is not limited thereby and numerous changes and modifications will be apparent to those skilled in the art without departing from the spirit and principles of the invention.

We claim:

1. In a process for manufacturing a composite steel structure by welding together at least a portion of at least two stainless steel plates at their interface, the sequential steps comprising cleaning the adjacent plate surfaces of said portion, placing said surfaces in contact with one another, bright annealing the assembled plates in a dry purified hydrogen atmosphere, cold rolling the sheets to a reduction in cross section of at least 50%, bright annealing the assembly in a dry purified hydrogen atmosphere to effect a recrystallization of the metal across the interface of said portion, and further cold rolling the assembly to a reduction in cross section of at least about 30% based on the thickness resulting from the first cold rolling operation.

2. In a process for manufacturing a composite stainless steel structure by welding together at least a portion of at least two stainless steel plates at their interface, the steps comprising cleaning the plate surfaces of said portion, placing the surfaces in contact with one another, annealing the assembled sheets in a purified hydrogen atmosphere, cold rolling the sheets to a reduction in cross section of at least 50%, bright annealing the assembly in a dry purified hydrogen atmosphere to promote diffusion bonding and stress relieving of the assembly, then cold rolling the assembly to a further reduction in cross section of at least about 30% based on the thickness resulting from the first reduction, and again annealing the structure in a dry purified hydrogen atmosphere to further promote diffusion bonding, homogeneity and stress relief of the structure.

3. In a process for manufacturing a composite stainless steel structure by welding together at least a portion of at least two stainless steel plates at their interface, the steps comprising cleaning the plate surfaces of said portion, placing the surfaces in contact with one another, annealing the assembled sheets in a dry hydrogen atmosphere at a temperature ranging from about 1800° F. to 2100° F. for a period of time sufficient to thoroughly soften the sheets and remove the oxides thereon, cold rolling the sheets to at least a 50% reduction in cross section, subjecting the assembly to a second annealing operation in a dry purified hydrogen atmosphere within a temperature range of about 1800° F. to 2100° F. for a time sufficient to stress relieve the structure and to promote diffusion bonding between said portion of the plates, subjecting the assembly to a second cold rolling operation involving at least a 30% reduction in cross section, and again annealing the structure in a dry purified hydrogen atmosphere within a temperature range of 1800° F. to 2100° F. for a time sufficient to stress relieve the structure and promote diffusion bonding and homogeneity of the structure throughout the cross section of said portion of the bonded plates.

4. In a process for manufacturing composite stainless steel plates by welding together at least a portion of two stainless steel plates at their interface, the steps comprising cleaning the plate surfaces of said portion, placing the surfaces in contact with one another, bright annealing the assembled sheets in a dry purified hydrogen atmosphere to a highly ductile condition, whereby the oxides on the plate surfaces are freely reduced, cold rolling the sheets to about a 50% to 60% reduction in cross section, subjecting the assembly to a second annealing operation in a dry hydrogen atmosphere to stress relieve the structure and promote diffusion bonding between said portion of the plates, then again cold rolling the assembly to at least a 30% reduction in cross section based on the thickness resulting from the first cold rolling operation, and again annealing the structure in a dry purified hydrogen atmosphere to further promote diffusion bonding and homogeneity of the structure.

5. In a process for manufacturing a composite steel structure by welding together at their interface at least a portion of at least two stainless steel plates having the nominal composition of about 16% to 18% chromium, about 10% to 14% nickel, about 2% to 3% molybdenum, about .10% maximum carbon, about 2% maximum manganese, about 1% maximum silicon and the balance substantially iron, the steps comprising cleaning the plate surfaces of said portion to be bonded, placing said surfaces in contact with one another, annealing the assembled sheets in a purified hydrogen atmosphere for about one hour at 2000° F., cold rolling the sheets to at least a 50% reduction in cross section, again annealing the assembly in a dry hydrogen atmosphere at a temperature of about 2000° F. for a period of time of about one hour, then again cold rolling the assembly to about at least a 30% reduction in cross section, and then again annealing the structure in a dry purified hydrogen atmosphere for a period of about one hour.

6. In a process for manufacturing a stainless steel article having integral passages therein, the steps comprising providing at least two stainless steel plates, cleaning the plate surfaces, applying a stop-weld material over portions of one of the plates which are not to be bonded, superimposing the other plate over the first-mentioned plate, whereby the stop-weld material is sandwiched between said plates, bright annealing the assembled plates in a dry purified hydrogen atmosphere at a temperature ranging from about 1800° F. to 2100° F. for a period of time sufficient to thoroughly soften the sheets and remove the oxides thereon, cold rolling the sheets to at least a 50% reduction in cross section, subjecting the assembly to a second bright annealing operation in a dry purified hydrogen atmosphere within a temperature range of 1800° F. to 2100° F. for a time sufficient to stress relieve the structure and promote diffusion bonding between the plates, then subjecting the assembly to a second cold rolling operation involving at least a 30% reduction in cross section based on the thickness resulting from the first cold rolling operation, then again annealing the structure in a dry purified hydrogen atmosphere within a temperature range of 1800° F. to 2100° F. for a time sufficient to stress relieve the structure and promote diffusion bonding and homogeneity of the structure throughout the portions of the cross section of the assembly which are bonded, and then subjecting the portions of the structure which are not bonded to hydraulic pressure, whereby these portions are expanded to form cavities.

7. In a process for manufacturing a stainless steel article having integral passages therein, said stainless steel having a nominal composition of about 16% to 18% chromium, about 10% to 14% nickel, about 2% to 3% molybdenum, about .1% maximum carbon, about 2% maximum manganese, about 1% maximum silicon and the balance substantially iron, the steps comprising providing at least two said stainless steel plates, cleaning the plate surfaces, applying a stop-weld material over portions which are not to be bonded of one of said plates, superimposing the other plate over the first-mentioned plate whereby the stop-weld material is sandwiched between said plates, bright annealing the assembled plates in a dry purified hydrogen atmosphere at a temperature ranging from about 1800° F. to 2100° F. for a period of time sufficient to thoroughly soften the sheets and remove the oxides thereon, cold rolling the sheets to at least a 50% reduction in cross section, subjecting the assembly to a second bright annealing operation in a dry purified hydrogen atmosphere within a temperature range of 1800° F. to 2100° F. for a time sufficient to stress relieve the structure and promote diffusion bonding between the plates, then subjecting the assembly to a second cold rolling operation involving at least a 30% reduction in cross section based on a thickness of the assembly resulting from the first cold rolling operation, then again annealing the structure in a dry purified hydrogen atmosphere within a temperature range of 1800° F. to 2100° F. for a time sufficient to stress relieve the structure and promote diffusion bonding and homogeneity of the structure throughout the portions of the cross section of the assembly which are bonded, and then subjecting the portions of the structure which are not to be bonded to hydraulic pressure, whereby these portions are expanded to form passages.

References Cited in the file of this patent

UNITED STATES PATENTS

| | | |
|---|---|---|
| 2,126,074 | Wissler | Aug. 9, 1938 |
| 2,562,467 | Kinnear | July 31, 1951 |
| 2,691,815 | Boessenkool et al. | Oct. 19, 1954 |
| 2,740,188 | Simmons | Apr. 3, 1956 |
| 2,766,514 | Adams | Oct. 16, 1956 |
| 2,906,006 | Neel | Sept. 29, 1959 |

OTHER REFERENCES

Making Shaping and Treating of Steel, 6th edition, published by United States Steel Company (Pittsburgh, Pa.), 1951 (p. 1324 relied upon).